United States Patent
Afrashteh et al.

(10) Patent No.: US 8,325,670 B2
(45) Date of Patent: Dec. 4, 2012

(54) METHOD, APPARATUS AND COMPUTER-READABLE MEDIUM FOR ASYMMETRIC FREQUENCY DIVISION DUPLEXING OPERATION

(75) Inventors: Alireza Afrashteh, Great Falls, VA (US); Masoud Olfat, Clarksville, MD (US); Douglas A. Hyslop, Fairfax, VA (US); Rajesh M. Gangadhar, Ashburn, VA (US)

(73) Assignee: Nextel Communications, Inc., Reston, VA (US)

( * ) Notice: Subject to any disclaimer, the term of this patent is extended or adjusted under 35 U.S.C. 154(b) by 1712 days.

(21) Appl. No.: 11/393,889

(22) Filed: Mar. 31, 2006

(65) Prior Publication Data

US 2007/0230414 A1 Oct. 4, 2007

(51) Int. Cl.
*H04W 4/00* (2009.01)

(52) U.S. Cl. ........ 370/330; 370/322; 370/329; 455/450; 455/452.1

(58) Field of Classification Search ............... 370/203, 370/208, 229, 230, 232, 233, 234, 235, 281, 370/295, 302, 319, 322, 329, 341, 344, 252, 370/463, 468, 462, 438, 470, 395.1, 395.41; 375/141, 316, 354, 377, 229
See application file for complete search history.

(56) References Cited

U.S. PATENT DOCUMENTS

| | | | | |
|---|---|---|---|---|
| 6,201,972 | B1 * | 3/2001 | Hamabe | 455/450 |
| 7,197,022 | B2 * | 3/2007 | Stanwood et al. | 370/337 |
| 2001/0036233 | A1 * | 11/2001 | Laroia et al. | 375/286 |
| 2002/0105935 | A1 * | 8/2002 | Miya | 370/342 |
| 2002/0122395 | A1 * | 9/2002 | Bourlas et al. | 370/329 |
| 2003/0214928 | A1 * | 11/2003 | Chuah | 370/336 |
| 2004/0179581 | A1 * | 9/2004 | Ozluturk | 375/141 |
| 2004/0240464 | A1 * | 12/2004 | Fite | 370/438 |
| 2005/0024258 | A1 * | 2/2005 | Matsuoka et al. | 342/70 |
| 2005/0243745 | A1 * | 11/2005 | Stanwood et al. | 370/280 |

* cited by examiner

Primary Examiner — Jean Gelin

(57) ABSTRACT

A method, apparatus, and computer-readable medium for performing asymmetric frequency division duplexing (FDD) are provided. The method includes allocating a first bandwidth for an uplink portion of an FDD data transmission; and allocating a second bandwidth for a downlink portion of the FDD data transmission; wherein the first bandwidth and the second bandwidth have different sizes.

34 Claims, 7 Drawing Sheets

METHOD, APPARATUS AND COMPUTER-READABLE MEDIUM FOR ASYMMETRIC FREQUENCY DIVISION DUPLEXING OPERATION

BACKGROUND OF THE INVENTION

Wireless frequency spectrum is controlled by government bodies. These government bodies allocate the frequency spectrum to particular wireless operators, and place conditions on how the frequency spectrum is used. For example, allocated frequency spectrum is typically required to operate either in a time division duplex (TDD) or frequency division duplex (FDD) mode. In a system that operates in a TDD mode, the uplink and downlink channels share the same frequency band, but are transmitted and received by the base station during mutually exclusive periods of time. In a system that operates in an FDD mode, the uplink and downlink channels are transmitted simultaneously on different frequency bands.

The 2.5 GHz frequency spectrum currently consists of TDD spectrum, and is being partially re-banded to support FDD. Currently, Code Division Multiple Access (CDMA) and the IEEE 802.16 standard, which uses Orthogonal Frequency Division Multiple Access (OFDMA), both support TDD and FDD modes. Typically, systems which use CDMA or the IEEE 802.16 standard operate in either a TDD or FDD mode.

TDD technologies are currently capable of flexible channel bandwidth support, such as Time Division-Code Division Multiple Access (TD-CDMA) supporting 5 MHz or 10 MHz with a chip rate change, or Worldwide Interoperability for Microwave Access (WiMAX) wireless technology supporting from 1.25 MHz to 20 MHz through either increasing tone spacing or Fast Fourier Transform (FFT) size in a scalable Orthogonal Frequency Division Multiple Access (OFDMA) system. In other words, these technologies are capable of supporting multiple bandwidths. Furthermore, the TDD nature of the technology allows a flexible allocation of radio resources between uplink and downlink through varying the time dedicated to each link.

The flexible allocation of radio resources between uplink and downlink is useful for asymmetric communications, such as data communications. In data systems, downlink traffic usually requires more control channel overhead, larger sized data traffic requests in the form of file downloads etc., broadcast/multicast services from base station to several mobile stations, or other requests that require higher resources (time or frequency) for the downlink, as compared to the uplink. TDD systems accommodate this situation by allowing a flexible downlink to uplink ratio (e.g. 2:1).

Compared to TDD systems, FDD systems are more effective in utilizing the spectrum, and avoid the need for stringent synchronization, as required between the downlink and uplink portion of a TDD frame in neighboring cell sites. This FDD characteristic greatly helps to avoid the interference caused by high power downlink transmission on neighboring low power uplink transmission. However, compared to TDD systems, conventional FDD systems cannot accommodate the asymmetrical nature of downlink and uplink traffic.

SUMMARY OF THE INVENTION

The present invention provides asymmetric FDD operation through flexible and adjustable FDD channel bandwidths. Spectrum is one of the most valuable and scarce resources for an operator. Thus, the best utilization of the spectrum must be obtained. The present invention provides an FDD system supporting varying channel bandwidths, which is flexible enough to accommodate the asymmetrical nature of some types of downlink and uplink traffic.

Exemplary embodiments of a method, apparatus, and computer-readable medium for performing asymmetric frequency division duplexing (FDD) are provided. The asymmetric FDD according to the present invention includes allocating an uplink bandwidth and allocating a downlink bandwidth, wherein the uplink and downlink bandwidths have different sizes. The uplink and downlink bandwidths may be adjusted, as needed.

Other objects, advantages, and novel features of the present invention will become apparent from the following detailed description of the invention when considered in conjunction with the accompanying drawings.

DETAILED DESCRIPTION OF THE EXEMPLARY EMBODIMENTS

Next-generation systems that will be deployed in the 2.5 GHz band for wireless broadband services must be flexible in spectrum utilization to maintain a low-cost base and support deployment under geographically varying spectrum positions. Ownership of the 2.5 GHz spectrum is fragmented, with many licensees owning small channels with a certain geographic limit. In order to minimize deployment cost and the cost of capacity growth, the next-generation technology deployed in this band must be flexible enough to support TDD, where a TDD spectrum is owned, to support FDD, where an FDD spectrum is owned, and to support a capacity growth plan that minimizes the cost of utilizing new pieces of spectrum that become available. Given the non-uniform nature of the 2.5 GHz spectrum, an FDD paired block may lie next to an unpaired block that could be used as an asymmetrical FDD block (described below). This is a new situation, providing new opportunities to better meet the asymmetrical traffic demand of data systems.

Figure 1:
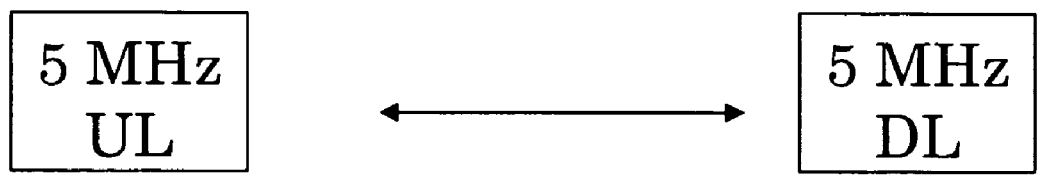
FIG. 1 illustrates a bandwidth allocation in which the uplink (UL) and the downlink (DL) have equal bandwidths.

Traditionally, FDD spectrum allocations are clearly defined with equal amounts of spectrum for the uplink and downlink, since the traditional use of spectrum has been for voice services that require uniform traffic in the uplink and downlink. The even distribution of resources between the uplink and downlink in traditional FDD spectrums is less optimal for a data deployment. FIG. 1 provides an example of paired FDD operation with 5 MHz channel bandwidth for both downlink and uplink, which is typical of most wireless systems today. Since it is possible that an operator might own disjointed portions of a spectrum, it is not plausible to allocate equal channel bandwidths to both downlink and uplink traffic without stranding portions of the spectrum. With the growing demand for wireless data, there is a great opportunity to make use of more spectrum in the downlink relative to the uplink, given the disparity in data traffic between the two links.

Exemplary embodiments of the present invention include an FDD system where the pairs of FDD blocks are non-uniform and have different channel bandwidths. Control channels or message based controls added to the air interface technologies would inform devices of the amount of spectrum allocated to the Base Transceiver Station (BTS) transmit and receive, providing a flexible use of different sized blocks of spectrum. This is different from what is proposed in a technology like the CDMA2000 3×RTT standard (3× refers to the number of 1.25 MHz wide radio carrier channels used, and RTT refers to radio-transmission technology), or multicarrier-data only (multicarrier-DO) technology, in the sense that the present invention proposes non-uniform spectrum pairs with the same single-carrier base station equipment, with the uplink and downlink bandwidths being allocated independent of each other, whereas multicarrier-DO allocates the same number of carriers for the uplink and the downlink.

For the single-carrier base station of the present invention, a portion of the channel is allocated to overhead. Likewise, a portion of each carrier channel in a CDMA2000 3×RTT system is allocated to overhead. However, since a CDMA2000 3×RTT system has three carrier channels, the single-carrier base station of the present invention requires less overhead than a CDMA2000 3×RTT system. This is an advantage of the present invention over systems such as a CDMA2000 3×RTT system and other systems which use multiple-carrier base station equipment.

Figure 2:
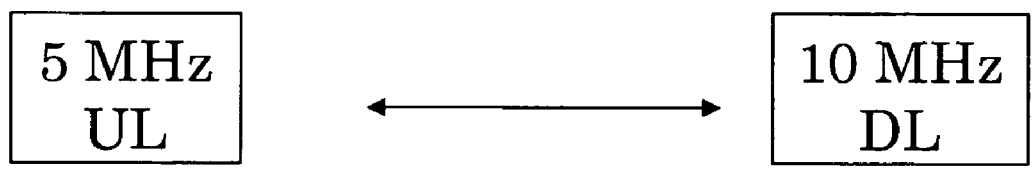
FIG. 2 illustrates a bandwidth allocation in which the downlink is allocated a larger bandwidth than the uplink, in accordance with an exemplary embodiment of the present invention.
Figure 3:
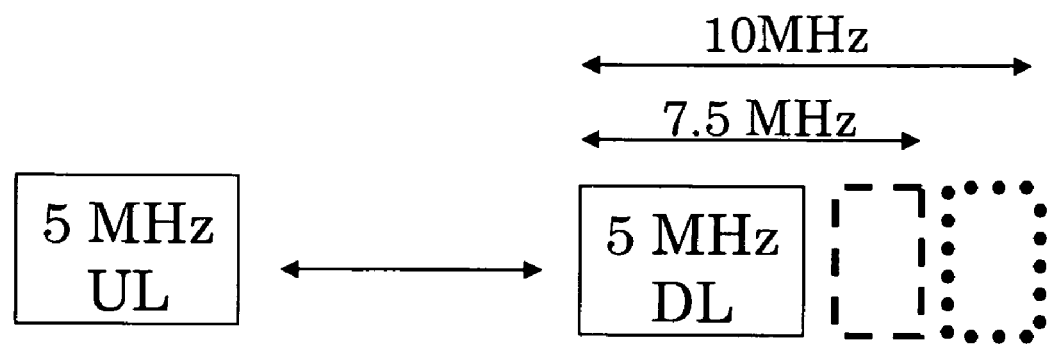
FIG. 3 illustrates an adjustable downlink bandwidth, in accordance with an exemplary embodiment of the present invention.

There are two approaches used to deploy such an FDD system. The first case is depicted in FIG. 2, wherein both the downlink and uplink channel bandwidths are initialized and stay the same during the operation of the system. However, the traffic loading in both downlink and uplink would typically vary by time, and, therefore, a fixed allocation might waste the resources. As a result, in a second embodiment of the present invention, which is illustrated in FIG. 3, the base station could use up to a certain channel bandwidth, for example, 10 MHz. A smaller channel bandwidth (e.g., 7.5 MHz or 5 MHz) could be allocated for the base station transmission, according to the system requirements or parameters like downlink traffic loading, coverage required, number of mobiles in the system, and services used (e.g., broadcast/multicast), for example. In other words, the channel bandwidth of the downlink illustrated in FIG. 3 is adjustable.

Figure 4:
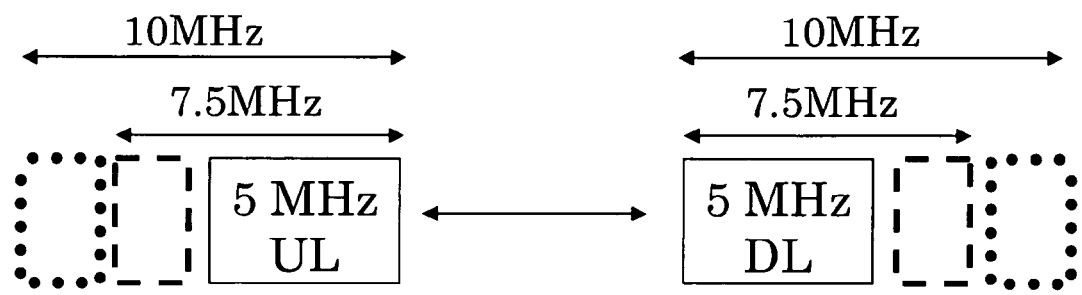
FIG. 4 illustrates adjustable uplink and downlink bandwidths, in accordance with an exemplary embodiment of the present invention.

In another exemplary embodiment of the present invention, as illustrated in FIG. 4, both downlink and uplink channel bandwidths are adjustable. As described above, the channel bandwidths may be adjusted, based upon the traffic loading of the channels, for example.

One example of a mechanism for implementing the flexible channel bandwidth would be for a CDMA system, wherein different chip rates could be employed in the downlink and uplink to achieve different channel bandwidths, resulting in different achieved data rates. A second example, for an OFDM system, would be the use of different FFT sizes driving different numbers of OFDM tones in the uplink and downlink.

The present invention has an additional advantage over how a TDD system achieves the asymmetric traffic allocation. In conventional TDD systems, the same downlink/uplink ratio must be defined for all sites in the system to avoid intra-system interference. In this invention for FDD, the asymmetry may be defined on a site-by-site basis, and varying by time or by user, as needed by the traffic demand, for example.

Figure 5:
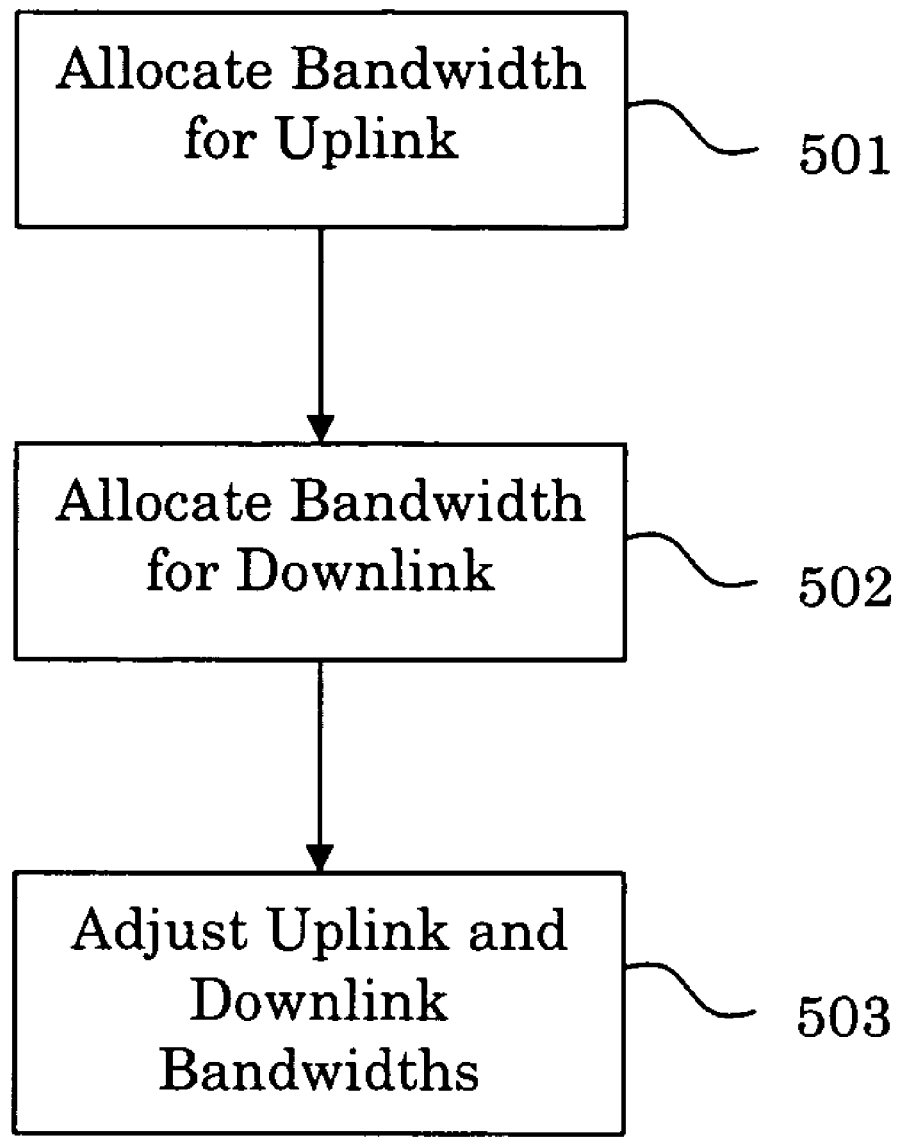
FIG. 5 illustrates an exemplary method for performing asymmetric FDD, in accordance with the present invention.

As illustrated in FIG. 5, an exemplary method according to the present invention includes allocating an uplink bandwidth (step 501); and allocating a downlink bandwidth (step 502); wherein the uplink and downlink bandwidths have different sizes. In another exemplary embodiment, the method further includes adjusting the uplink and/or downlink bandwidths, as needed, based upon characteristics of the channel, such as traffic loading, for example (step 503).

In an exemplary embodiment of the present invention, a computer-readable medium encoded with a computer program for performing asymmetric frequency division duplexing (FDD) is provided. The term "computer-readable medium" as used herein refers to any medium that participates in providing instructions for execution. Such a medium may take many forms, including but not limited to, non-volatile media, volatile media, and transmission media. Non-volatile media includes, for example, optical or magnetic disks. Volatile media includes, for example, dynamic memory. Transmission media includes coaxial cables, copper wire, and fiber optics. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave, or any other medium from which a computer can read.

As illustrated in FIG. 5, the computer program includes instructions for allocating an uplink bandwidth (step 501); and allocating a downlink bandwidth (step 502). The instructions may further include adjusting the uplink and downlink bandwidths, as needed, based upon the conditions of the channel (step 503). In an exemplary embodiment, the traffic loading of the channel is used to determine the adjustment of the uplink and downlink bandwidths.

Figure 6:
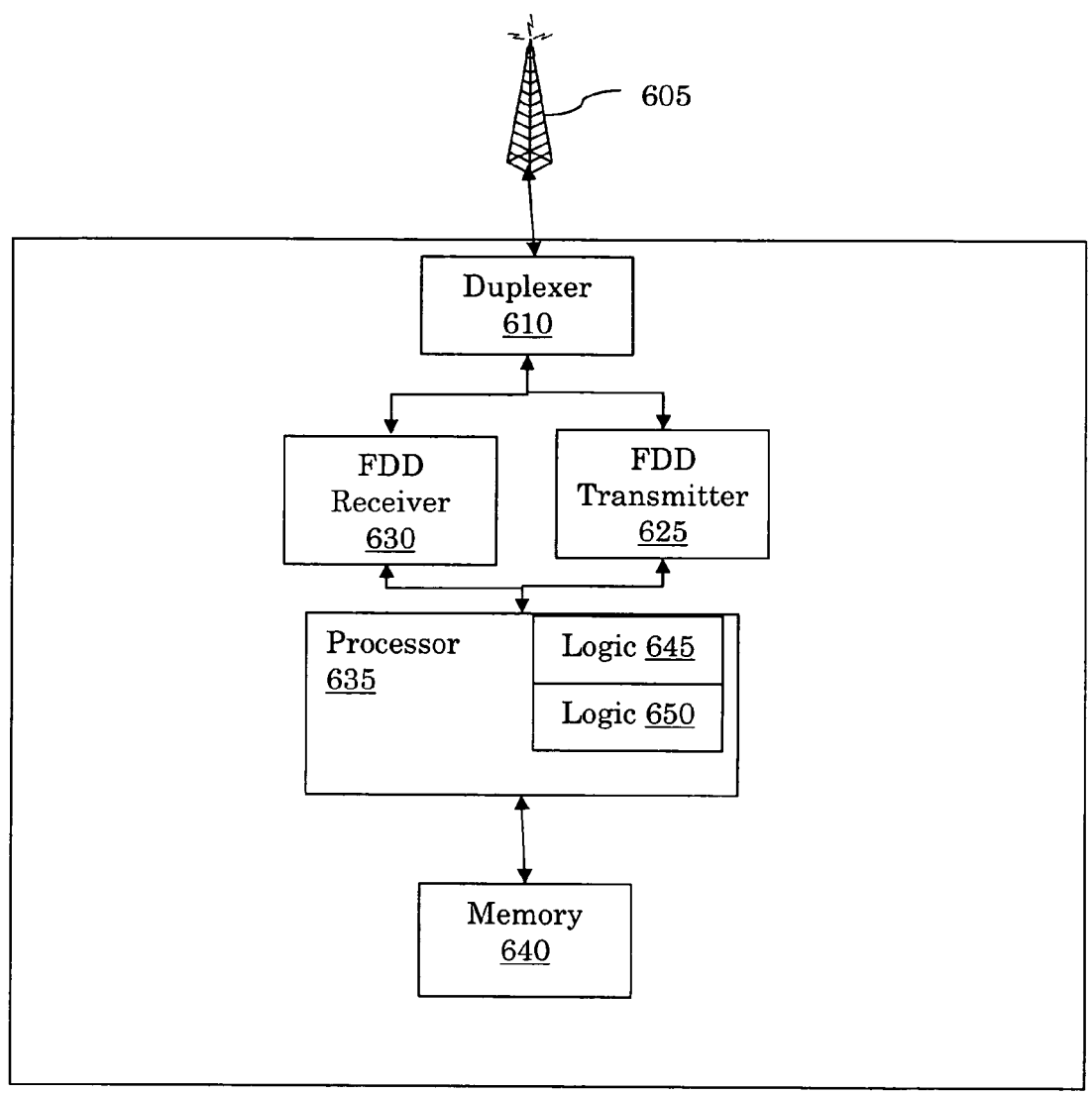
FIG. 6 illustrates an exemplary embodiment of a base transceiver station according to the present invention.

FIG. 6 is a block diagram illustrating an exemplary base transceiver station in accordance with a first aspect of the present invention. The base transceiver station includes a base station antenna 605 coupled to a duplexer 610. The duplexer 610 is coupled to an FDD transmitter 625 and an FDD receiver 630. The transmitter 625 and receiver 630 represent the entire radio frequency processing chain, i.e., they can include down converters, baseband processors, and the like. Although FIG. 6 illustrates only one FDD transmitter 625 and receiver 630, if the base transceiver station supports more than one FDD channel pair, the base transceiver station can include more than one FDD transmitter 625 and receiver 630.

Processor 635 is coupled to transmitter 625 and receiver 630, and includes logic 645 and logic 650. Logic 645 can allocate a first bandwidth for an uplink portion of an FDD data transmission, and logic 650 can allocate a second bandwidth for a downlink portion of the FDD data transmission. The allocation of the first and second bandwidths for the uplink and downlink portions, respectively, of the FDD data transmission is described above. Processor 635 can be a microprocessor, field programmable gate array (FPGA), application specific integrated circuit (ASIC) and/or the like. Processor 635 is also coupled to a memory 640. Memory 640 can be a random access memory (RAM), read only memory (ROM), flash memory, hard disk, and/or the like.

Figure 7:
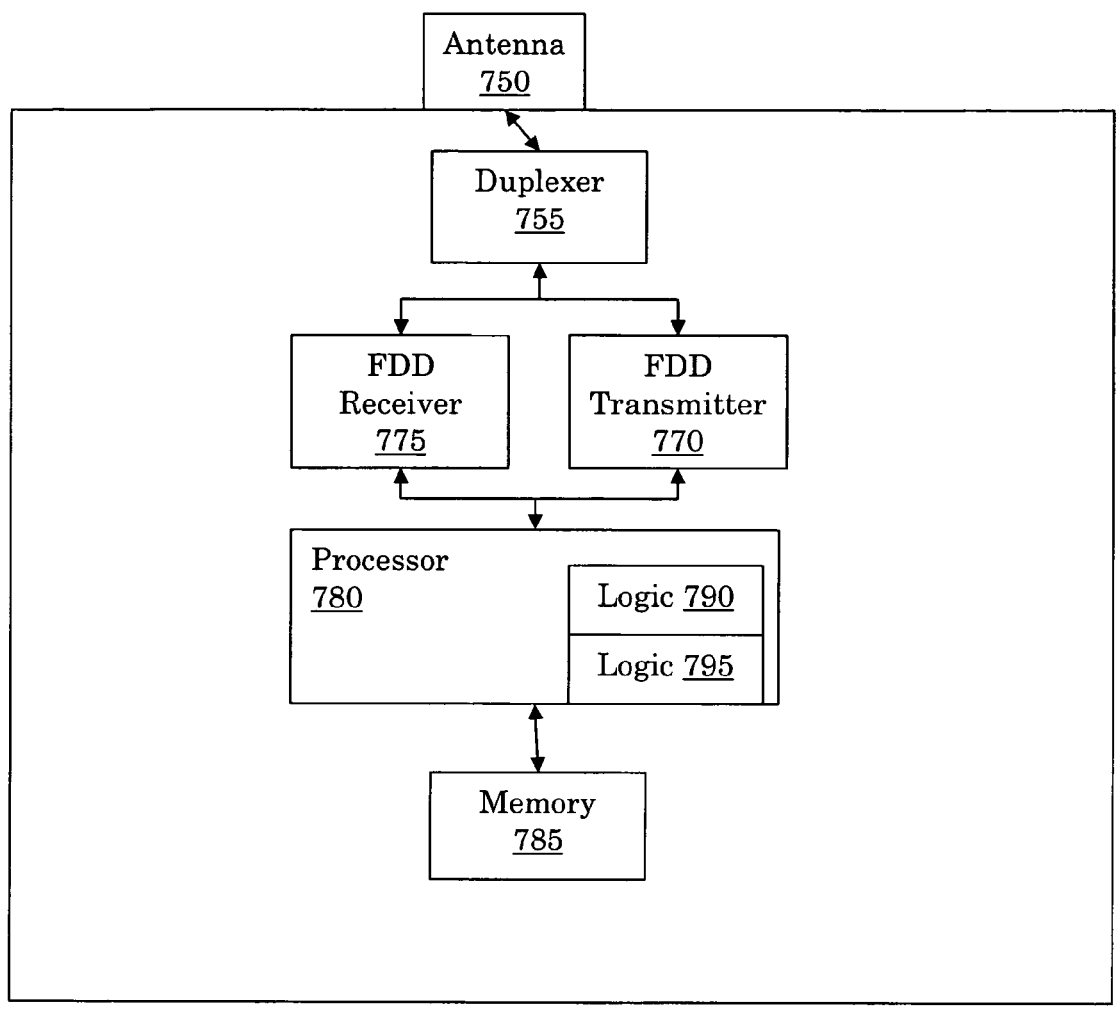
FIG. 7 illustrates an exemplary embodiment of a wireless communication device according to the present invention.

FIG. 7 is a block diagram illustrating an exemplary wireless communication device in accordance with a first aspect of the present invention. The wireless communication device can be a wireless telephone, computer, personal digital assistant (PDA) and/or the like. The wireless communication device includes antenna 750 coupled to a duplexer 755. The duplexer 755 is coupled to an FDD transmitter 770 and an FDD receiver 775. The transmitter 770 and receiver 775 represent the entire radio frequency processing chain, i.e., they can include down converters, baseband processors, and the like. A processor 780 is also coupled to transmitter 770 and receiver 775, and includes logic 790 and logic 795. Logic 790 can receive an allocation of a first bandwidth for an uplink portion of an FDD data transmission, and logic 795 can receive an allocation of a second bandwidth for a downlink portion of the FDD data transmission. The allocation of the first and second bandwidths for the uplink and downlink portions by the base station, respectively, of the FDD data transmission is described above. Processor 780 can be a microprocessor, field programmable gate array (FPGA), application specific integrated circuit (ASIC), and/or the like. Processor 780 is coupled to a memory 785. Memory 785 can be a random access memory (RAM), read only memory (ROM), flash memory, hard disk, and/or the like.

Although the base transceiver station of FIG. 6 and the wireless communication device of FIG. 7 are illustrated with similar components, these components will operate differently, due to the differences between the functionality and requirements of the base transceiver station and the wireless communication device. For example, wireless communication devices typically operate using components and techniques designed to conserve power because they operate using batteries, and base transceiver stations typically require components capable of generating high transmission powers.

While the invention has been described in connection with various embodiments, it will be understood that the invention is capable of further modifications. This application is intended to cover any variations, uses or adaptation of the invention following, in general, the principles of the invention, and including such departures from the present disclosure as, within the known and customary practice within the art to which the invention pertains.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for performing asymmetric frequency division duplexing (FDD), the method comprising the acts of:
   allocating a first bandwidth for an uplink portion of an FDD data transmission; and
   allocating a second bandwidth for a downlink portion of the FDD data transmission;
   wherein the first bandwidth and the second bandwidth have different sizes, and
   wherein allocating the first bandwidth is independent of allocating the second bandwidth.

2. The method of claim 1, wherein the second bandwidth is adjustable.

3. The method of claim 1, wherein the first and second bandwidths are adjustable.

4. The method of claim 1, wherein the first and second bandwidths are allocated, based upon a level of data traffic.

5. The method of claim 2, wherein the second bandwidth is adjusted, based upon a level of data traffic.

6. The method of claim 3, wherein the first and second bandwidths are adjusted, based upon a level of data traffic.

7. The method of claim 1, wherein the sizes of the first bandwidth and the second bandwidth are determined by chip rates.

8. The method of claim 1, wherein the sizes of the first bandwidth and the second bandwidth are determined by a number of Orthogonal Frequency Division Multiplexing (OFDM) tones.

9. A non-transitory computer-readable medium encoded with a computer program for performing asymmetric frequency division duplexing (FDD), the computer program comprising instructions for:
   allocating a first bandwidth for an uplink portion of an FDD data transmission; and
   allocating a second bandwidth for a downlink portion of the FDD data transmission;
   wherein the first bandwidth and the second bandwidth have different sizes, and
   wherein allocating the first bandwidth is independent of allocating the second bandwidth.

10. The computer-readable medium of claim 9, wherein the second bandwidth is adjustable.

11. The computer-readable medium of claim 9, wherein the first and second bandwidths are adjustable.

12. The computer-readable medium of claim 9, wherein the first and second bandwidths are allocated, based upon a level of data traffic.

13. The computer-readable medium of claim 10, wherein the second bandwidth is adjusted, based upon a level of data traffic.

14. The computer-readable medium of claim 11, wherein the first and second bandwidths are adjusted, based upon a level of data traffic.

15. The computer-readable medium of claim 9, wherein the sizes of the first bandwidth and the second bandwidth are determined by chip rates.

16. The computer-readable medium of claim 9, wherein the sizes of the first bandwidth and the second bandwidth are determined by a number of Orthogonal Frequency Division Multiplexing (OFDM) tones.

17. A base transceiver station, comprising:
   logic for allocating an uplink channel bandwidth of an FDD channel pair; and
   logic for allocating a downlink channel bandwidth of the FDD channel pair;
   wherein the bandwidth of the uplink and downlink channels are allocated independent of each other, and
   wherein allocating the first bandwidth is independent of allocating the second bandwidth.

18. The base transceiver station of claim 17, wherein the downlink channel bandwidth is adjustable.

19. The base transceiver station of claim 17, wherein the uplink and downlink channel bandwidths are adjustable.

20. The base transceiver station of claim 17, wherein the uplink and downlink channel bandwidths are allocated, based upon a level of data traffic.

21. The base transceiver station of claim 18, wherein the downlink channel bandwidth is adjusted, based upon a level of data traffic.

22. The base transceiver station of claim 19, wherein the uplink and downlink channel bandwidths are adjusted, based upon a level of data traffic.

23. The base transceiver station of claim 17, wherein the sizes of the uplink and downlink channel bandwidths are determined by chip rates.

24. The base transceiver station of claim 17, wherein the sizes of the first bandwidth and the second bandwidth are determined by a number of Orthogonal Frequency Division Multiplexing (OFDM) tones.

25. The base transceiver station of claim 17, wherein the base transceiver station is configured to operate using a single carrier.

26. A wireless communication device, comprising:
a frequency division duplexing (FDD) transmitter;
an FDD receiver; and
a processor including:
logic for receiving a first bandwidth allocation for an uplink portion of an FDD data transmission; and
logic for receiving a second bandwidth allocation for a downlink portion of the FDD data transmission;
wherein the first bandwidth and the second bandwidth have different sizes, and
wherein allocating the first bandwidth is independent of allocating the second bandwidth.

27. The wireless communication device of claim 26, wherein the second bandwidth is adjustable.

28. The wireless communication device of claim 26, wherein the first and second bandwidths are adjustable.

29. The wireless communication device of claim 26, wherein the first and second bandwidths are allocated, based upon a level of data traffic.

30. The wireless communication device of claim 27, wherein the second bandwidth is adjusted, based upon a level of data traffic.

31. The wireless communication device of claim 28, wherein the first and second bandwidths are adjusted, based upon a level of data traffic.

32. The wireless communication device of claim 26, wherein the sizes of the first bandwidth and the second bandwidth are determined by chip rates.

33. The wireless communication device of claim 26, wherein the sizes of the first bandwidth and the second bandwidth are determined by a number of Orthogonal Frequency Division Multiplexing (OFDM) tones.

34. The wireless communication device of claim 26, wherein the wireless communication device is configured to operate using a single carrier.

* * * * *